United States Patent [19]

Stoll

[11] 4,402,394

[45] Sep. 6, 1983

[54] CONVEYOR BELT SCRAPER

[76] Inventor: Donald L. Stoll, c/o Richwood Industries, Inc., P.O. Box 652, Huntington, W. Va. 25711

[21] Appl. No.: 286,785

[22] Filed: Jul. 27, 1981

[51] Int. Cl.³ .......................................... B65G 45/00
[52] U.S. Cl. ................................................... 198/499
[58] Field of Search ............... 198/497, 498, 499, 635; 15/250.36, 250.4, 250.41, 250.42, 256.5, 256.51, 256.6

[56] References Cited

U.S. PATENT DOCUMENTS

| | | | |
|---|---|---|---|
| 1,875,442 | 9/1932 | Greg . | |
| 2,227,776 | 1/1941 | Anderson | 198/229 |
| 2,393,724 | 1/1946 | Vickers | 198/230 |
| 3,504,786 | 4/1970 | Matson | 198/499 |
| 3,722,667 | 3/1973 | Olson | 198/499 |
| 3,999,649 | 12/1976 | Andersson | 198/499 |
| 4,189,046 | 2/1980 | Ward et al. | 198/499 |

FOREIGN PATENT DOCUMENTS

| | | | |
|---|---|---|---|
| 1953493 | 10/1969 | Fed. Rep. of Germany | 198/497 |
| 10047 | of 1912 | United Kingdom . | |
| 503636 | 11/1937 | United Kingdom . | |
| 2053121 | 2/1981 | United Kingdom | 198/499 |

OTHER PUBLICATIONS

Catalog No. C-218, "Conveyor Components," Conveyor Components Company, pp. 10-11, 1970.
"Gordon Belt Scrapers," Mine Equipment Manufacturing Co.
"The Dick-Gimbal Conveyor Belt Cleaner," R. J. Dick, Inc.
Form No. 2829-178, "New Martin Trac-Mount System for Belt Cleaners," Martin Engineering Company, 1977.
Form No. 2732-178, "Martin Heavy Duty Conveyor Belt Cleaner Systems," Martin Engineering Company, 1977.
Bulletin 33-A, "Model 33 Coil Spring Type Conveyor Belt Cleaner," Material Control, Inc., 1975.
Bulletin MC-430, "New Model 76 Rubber Wiper Blade Type Conveyor Belt Cleaner," Material Control, Inc., 1974.
"Trellex Belt Scrapers," Trelleborg Inc.
"Tip Top Belt Cleaning Systems," Tip Top Stahlgruber.
Form No. 7032, "Now: A Better Way to Clean Conveyor Belts," Plastic Techniques Inc.
"Flex-o-Disc Conveyor Belt Scraper," Asgco Manufacturing.
Bulletin SV-568, "Schaefer S-Veco Conveyor Belt Cleaner," Schaefer Brush Mfg. Co., Inc.
Bulletin 99-C, "Model 99 Brush Type Conveyor Belt Cleaner," Material Control, Inc., 1977.
"Vibratory Belt Cleaner," Vibco.
"Cottrell Belt Cleaner Installation Instructions," Cottrell.

Primary Examiner—Joseph E. Valenza
Assistant Examiner—Dennis J. Williamson
Attorney, Agent, or Firm—Biebel, French & Nauman

[57] ABSTRACT

A conveyor belt scraper is used in combination with a conveyor belt and consists of a primary axle, at least one primary actuator arm attached to and extending from the primary axle, a secondary axle which is preferably concentric with the primary axle and is capable of rotational movement with respect thereto, at least one secondary actuator arm attached to the secondary axle and extending outwardly therefrom, a primary scraper extending from the primary axle which includes a primary blade for engaging a belt, a secondary scraper extending from the secondary axle and including a secondary scraper blade for engaging a belt, an air cylinder attached to and extending between the primary and secondary tension arms, and a mounting bracket for mounting the primary and secondary axles to a support. The air cylinder urges the primary and secondary actuator arms apart which causes the primary axle and scraper to rotate counter to the secondary axle and scraper, thereby urging the primary and secondary scrapers toward each other and against a portion of a conveyor belt.

14 Claims, 6 Drawing Figures

CONVEYOR BELT SCRAPER

BACKGROUND OF THE INVENTION

1. Field of the Invention

The present invention relates to scrapers for cleaning the working surfaces of conveyor belts, and, more particularly, to conveyor belt scrapers having resilient means to urge scraper blades into the belt surface.

2. Prior Art

Conveyor belt machinery is often used to convey particulate materials which have a tendency to adhere to the working surface of the conveyor belt. For example, in the coal mining industry, it is necessary to wet the chunks of coal transported by conveyor belts in and around coal mines. This is necessary to reduce the amount of airborne coal dust. A consequence of wetting the chunks of coal on the conveyor belts is that the fine coal dust particles become sticky and adhere to the working surface of the conveyor belt. This mud-like accumulation tends to build up on the return idler rollers which support the underside or return flight of the conveyor belt and may tend to jam the rollers and generate dangerously high temperatures which may ignite the coal dust. Thus, it is necessary to employ conveyor belt scrapers to remove the accumulation of wetted particulate matter from these conveyor systems.

There are many types of conveyor belt scrapers in use. For example, U.S. Pat. No. 3,999,649 is directed to a conveyor belt scraper having an axle rotatably mounted to a support located proximate the return flight of a conveyor belt, a pair of primary arms attached to and extending outwardly from the ends of the axle and supporting a counterweight, and a pair of secondary arms extending from the ends of the axle and suppporting a blade assembly which engages the belt. The counterweight is positioned so that it causes the axle to rotate thereby urging the blade assembly upward into the return flight of the belt.

Similarly, U.S. Pat. No. 1,875,442 discloses a belt scraper having a fulcrum mounted beneath the return flight of the conveyor belt, and a U-shaped lever arm attached to the fulcrum. At the ends of the U-shaped lever arm a pair of weights are mounted causing the opposite portion of the lever arm to be urged upwardly into the return flight of the conveyor belt. A series of blades are mounted on the opposite portion of the lever arm and are positioned to engage the belt when the lever arm is pivoted about the fulcrum. The blades are disposed at an angle with respect to the travel of the lever arm thereby urging accumulated material off to one side in much the same fashion as the action of a snow plow.

A disadvantage with these types of belt scrapers is that they rely on gravity to urge the scraper blade or blades into the conveyor belt. Thus, the positioning of the scraper blades is severly limited; the apparatus must be positioned such that the counterweight may rotate the blade arm about a fulcrum or axle upwardly into the belt. An additional disadvantage is that unevenness in that belt or the rollers may cause the blade to bounce away from the belt, thereby leaving portions of the belt unscraped and allowing the accumulated material on those portions to adhere to idler rollers downstream of the scraper.

A second type of conveyor belt scraper is disclosed in U.S. Pat. No. 2,393,724. This scraper includes a central axle, a lever arm mounted to an end of the axle and extending outwardly therefrom, and a U-shaped blade mount attached to the axle and extending outwardly therefrom. The lever arm slidably engages a rod mounted to the conveyor frame which carries a coil spring. The coil spring extends between the end of the lever arm and a stop such that it causes the lever arm to move away from the stop thereby rotating the axle which causes the blade assembly to rotate upwardly into the conveyor belt. A disadvantage with this type of belt scraper is that it does not counteract "chatter" of the scraper which may occur when the scraper encounters small lumps stuck to the belt. In addition, it is necessary for the rod on which the spring is mounted to be attached to a bar which is rigidly mounted to a portion of the conveyor belt frame. This limits the positioning of the belt scraper apparatus with respect to the belt.

Accordingly, there is a need for a conveyor belt scraper which includes a means for urging the scraper blade or blades into the belt without the use of burdensome counterweights, a belt scraper which can be positioned in a variety of locations relative to the conveyor belt, and a scraper which minimizes chatter of the scraper blade as it encounters larger chunks of material adhering to the belt.

SUMMARY OF THE INVENTION

The present invention provides a conveyor belt scraper having two scraper members mounted to engage the working surface of a conveyor belt, and which are forced against the belt by actuator arms which counterrotate the blades. The force urging the blades against the belt is derived by resilient means such as an air-over-hydraulic cylinder which acts between the arms that rotate the scraper blades. The scraper apparatus of the present invention can be mounted in a number of locations relative to the conveyor belt since bulky counterweights or massive support structure is not needed to urge the blades into the working surface of the belt.

The belt scraper apparatus of the present invention includes primary and secondary axles which are concentric and capable of rotational movement with respect to each other, primary and secondary scraper members extending from the primary and secondary axles, respectively, and primary and secondary actuator arms attached to the primary and secondary axles, respectively. A resilient member, such as a pneumatic or hydraulic cylinder, is mounted between the primary and secondary actuator arms and exerts a rotational force on them, urging them apart, thereby causing the primary and secondary scraper members to rotate relative to each other and toward the belt. The scraper apparatus of the present invention also includes a pair of mounting flanges, having main pivot bearings receiving the axles, which are used to mount the scraper to a support member proximate a conveyor belt structure.

The primary scraper member consists of a pair of primary scraper arms fixedly mounted to the primary axle, and a primary scraper blade which is adjustably mounted to and extends between the primary scraper arms. Similarly, the secondary scraper member includes a pair of secondary scraper arms fixedly mounted to the secondary axle, and a secondary scraper blade adjustably mounted to and extending between the secondary scraper arms.

Although the belt scraper is operable with a single pair of primary and secondary actuator arms, in a preferred embodiment two pairs of primary and secondary tension arms are used, each pair disposed at a different end of the axles. Also in the preferred embodiment, the belt scraper further includes a main shaft which maybe simply a cylindrical steel shaft for imparting rigidity to the scraper structure. The secondary axle comprises two inner sleeve members, each fitting over a different end of the main shaft. Each inner sleeve supports one of the secondary scraper arms at an inside end and one of the secondary actuator arms at an outside end. The inner sleeve members are joined by the secondary scraper blade, which extends between the secondary scraper arms and is adjustably attached to the secondary scraper arms.

Similarly, the primary axle preferably comprises two outer sleeve members, each positioned over and concentric with a different one of the inner sleeve members. The outer sleeve members are capable of rotation relative to the inner sleeve members and preferably the belt scraper includes a bushing made of a suitable bearing material such as polyethylene. Each outer sleeve member is substantially cylindrical in shape and supports a primary scraper arm at an inside end and a primary actuator arm at an outside end. The outer sleeve members are joined by the primary scraper blade which extends between the primary scraper arms and is adjustably attached to the primary scraper arms. Each pair of primary and secondary sleeve members are retained on the main axle by means of a collar fixed to the main shaft which abuts the inside ends of the sleeves and a washer and cap screw which is mounted into the end of the main axle and abuts the outside ends of the sleeves. The actuator arms are located at the outside ends of each of the sleeve members to provide an even application of counterrotational force to the primary and secondary blades that eliminates the possibility of blade warpage during use.

The mounting flanges of the preferred embodiment are generally annular in shape and have central openings which receive the outer sleeve members. The central openings are lined with a suitable bearing material such as polyethylene which enables the outer sleeve members to rotate with respect to the flanges. The mounting flanges may include mounting holes which receive bolts so that the mounting flanges can be attached to a support structure and positioned near a conveyor belt, or attached directly to the conveyor belt structure.

The actuator arms preferably are separated by an automotive type air-over hydraulic cylinder or an air-loaded shock absorber which is rotatably attached to an end of each arm. The cylinder is charged with compressed air and serves to urge the primary and secondary actuator arms apart with a predetermined force. This force causes the inner and outer sleeve members to rotate relative to each other and urge the primary and secondary scraper blades towards each other. Preferably, the conveyor belt scraper apparatus is positioned proximate the head pulley of a conveyor belt such that the primary and secondary scraper blades contact the conveyor belt at different points along the arc of the head pulley. Thus, as the air cylinder urges the primary and secondary blades together, they both rotate toward and engage the working surface of the conveyor belt, and the blades can then remove particulate matter which has accumulated on the belt.

Preferably, the primary actuator arms are adjustably attachable to the outer sleeve members by the use of set screws. Thus, the primary actuator arms may be rotated with respect to the outer sleeve members to which they are attached and fixedly positioned such that the primary and secondary scraper blades can be separated a preselected distance from each other. This adjustable mounting, combined with the adjustability of the blades, enables the belt scraper of the present invention to engage a conveyor belt at any location along the conveyor belt path.

When the belt scraper engages a conveyor belt, the primary and secondary scrapers react against each other, the primary and secondary blades and actuator arms tending to rotate away from each other. However, this force is counteracted by the extensive force of the air cylinders against the primary and secondary actuator arms, which tends to cause them and the blades to rotate toward each other. The result is a state of dynamic equilibrium. The inherent damping and rebound suppressing properties of the air cylinders eliminate chattering and skipping of the primary and secondary blades as they encounter larger lumps or other irregularities located on the working surface of the conveyor belt.

The belt scraper preferably is mounted adjacent the head pulley of a conveyor system such that the primary and secondary blades engage the belt at different locations about its arcuate path as it travels about the head pulley. The belt scraper is better able to grip the belt at this location, and the material removed may be collected and removed more easily. An alternative mounting location for the scraper apparatus is along the flat return portion of the conveyor belt. To facilitate mounting in this location, an idler roller is mounted to the scraper supporting framework by anti-friction bearings such that the belt is deflected downwardly around the roller. The main axle of the scraper apparatus is mounted directly through the idler roller and the primary and secondary arms positioned such that the primary and secondary scraper blades engage the belt on either side of the idler roller. Thus, the belt travels over the primary scraper blade, under the roller, and over the secondary scraper blades, and the blades are urged together to "pinch" the belt against the roller by the action of the cylinder between the actuator arms.

Accordingly, it is an object of the present invention to provide a conveyor belt scraper in which the scraper blades are urged against the conveyor belt without need of cumbersome counterweights; to provide a belt scraper which possesses inherent damping characteristics to eliminate chattering and skipping of the scraper against the belt; and to provide a belt scraper which can be positioned against a conveyor belt at any location.

Other objects and advantages of the invention will be apparent from the following description, the accompanying drawings, and the appended claims.

DETAILED DESCRIPTION OF THE PREFERRED EMBODIMENT

Figure 1:
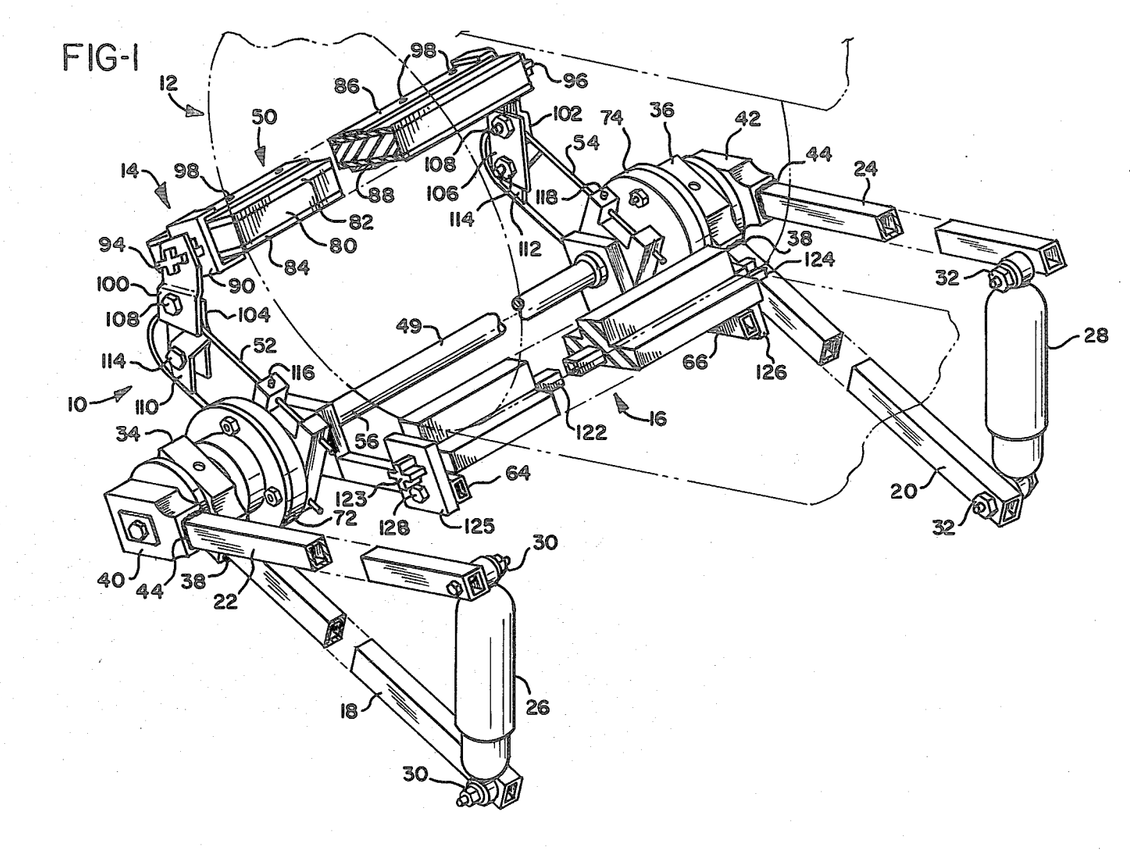
FIG. 1 is a perspective view of a preferred embodiment of the belt scraper of the present invention shown with the primary and secondary scraper blades, the main shaft, and the primary and secondary actuator arms have been broken and shortened for purposes of illustration, and the scraper is shown engaging a conveyor belt assembly which is illustrated in phantom.
Figure 2:
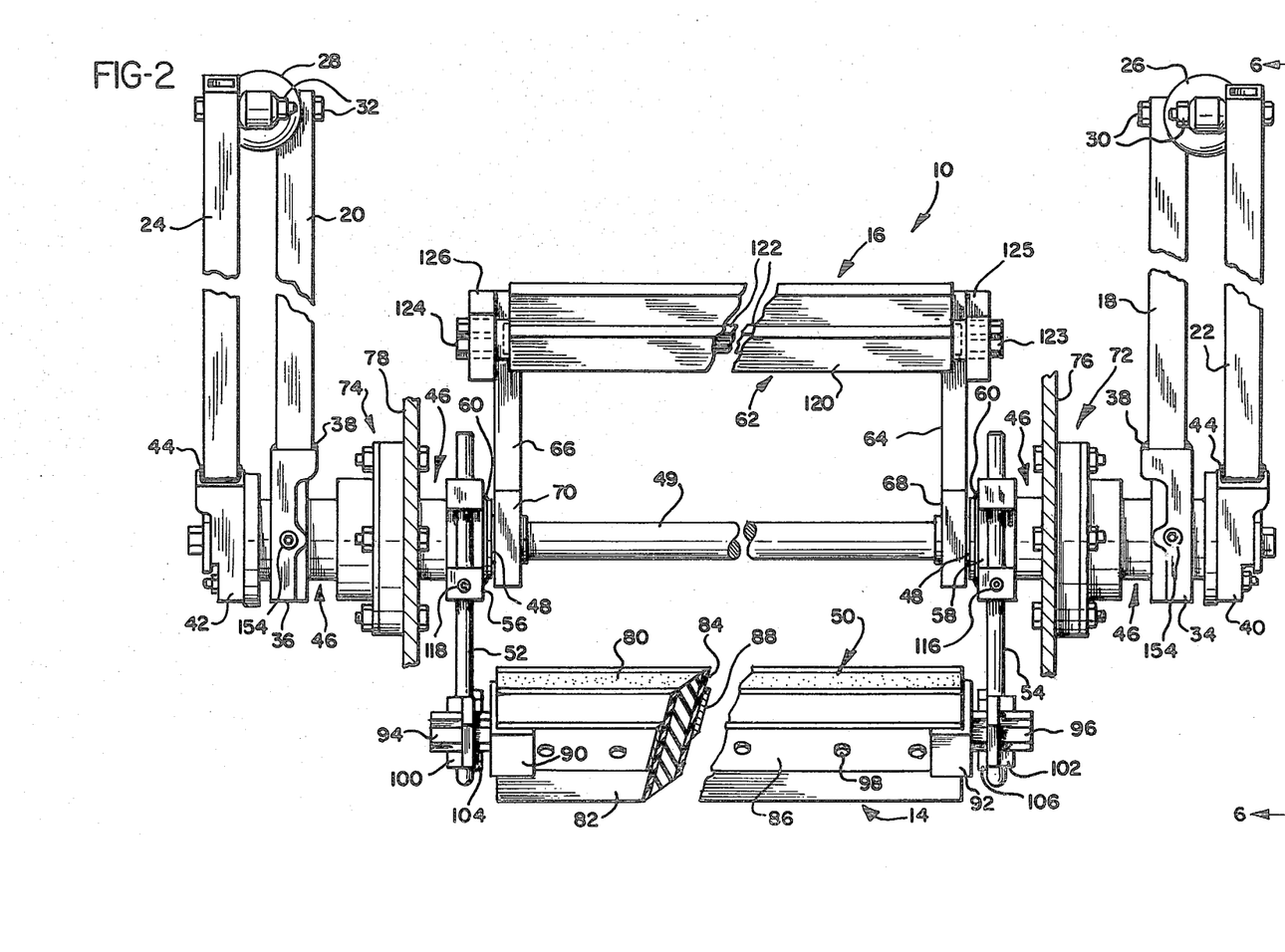
FIG. 2 is a plan view of the scraper shown in FIG. 1 in which the primary and secondary blades, main shaft, and primary and secondary arms have been broken and shortened for purposes of illustration.

As shown in FIGS. 1 and 2, the conveyor belt scraper of the present invention, generally designated 10, is used in combination with a conveyor belt assembly, generally designated 12. The belt scraper 10 includes a primary scraper member 14, a secondary scraper member 16, primary actuator arms 18, 20, and secondary actuator arms 22, 24. Air-over hydraulic cylinders 26, 28 extend between primary actuator arms 18, 20 and secondary actuator arms 22, 24, respectively. The air cylinders 26, 28, which may comprise air-loaded hydraulic shock absorbers, are attached to the ends of the primary and secondary tension arms 18, 20, 22, 24 by conventional means such as nut and bolt combinations 30, 32. The cylinders 26, 28 preferably are automotive types, such as Columbus-Part No. 107413 manufactured by A.P. Parts, Toledo, Ohio.

The primary actuator arms 18, 20 are retained within primary actuator arm mounting brackets 34, 36 by welds 38. Similarly, secondary actuator arms 22, 24 are retained within secondary actuator arm mounting brackets 40, 42 by welds 44. The primary actuator arm mounting brackets 34, 36 are generally annular in shape and include central openings (not shown) which receive the outside ends of primary axles 46. Secondary actuator arm mounting brackets 40, 42 include central openings (not shown) which receive the outside ends of secondary axles 48, which are concentric with respect to primary axle 46. Secondary axles 48 are cylindrical in shape and are fitted over main shaft 49.

The primary blade 50 extends between primary blade support arms 52, 54 which are adjustably mounted within primary blade support brackets 56, 58. Primary blade support brackets 56, 58 each include an opening (not shown) which receives an inside end of the primary axle 46. The primary blade support brackets 56, 58 are mounted to the primary axles 46 by conventional means such as welds 60.

Secondary scraper member 16 includes a secondary blade 62 which is mounted on secondary blade support arms 64, 66. Secondary blade support arms 64, 66 include a block portion 68, 70, each having an opening (not shown) which receives an inside end of the secondary axles 48.

The scraper 10 also includes mounting flanges 72, 74 which are journalled over the primary axles 46. The mounting flanges 72, 74 are adapted to be attached to suitable supporting structure such as walls 76, 78 which may comprise a support separate from the conveyor belt assembly, or may be a portion of the conveyor belt support structure itself.

Figure 3:
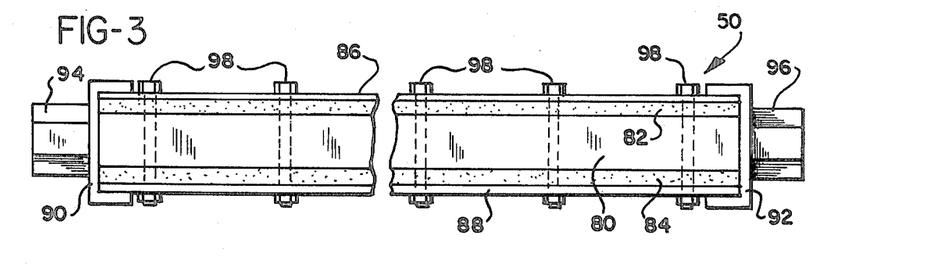
FIG. 3 is a front view of a primary scraper blade of the scraper illustrated in FIG. 1.

As shown in FIGS. 1, 2, and 3, the primary blade 50 comprises a central core 80 preferably made of a relatively soft rubber, and upper and lower layers 82, 84 of a relatively hard rubber, preferably approximately 70 durometer. The core 80 and layers 82, 84 are sandwiched between upper and lower plates 86, 88, which are joined to each other by U-shaped end plates 90, 92, which fit over plates 86, 88 and are preferably held by welds. End plates 90, 92 include stubs 94, 96 projecting outwardly therefrom. Stubs 94, 96 are preferably cruciform. The central core 80 and upper and lower layers 82, 84 are retained within the framework of the upper and lower plates 86, 88 and end plates 90, 92 by nut and bolt combinations 98 which extend through openings in the upper and lower plates and through openings in the central core and upper and lower layers.

As best shown in FIGS. 1 and 2, the stubs 94, 96 are received within mating cruciform-shaped openings formed in flanges 100, 102. Flanges 100, 102 are bolted to mounting flanges 104, 106 by nut and bolt combinations 108. Primary blade support arms 52, 54 are generally U-shaped and include arcuate central cross members 110, 112. Mounting flanges 104, 106 are bolted to cross members 110, 112, respectively, by nut and bolt combinations 114. When assembled, flanges 100, 102, together with mounting flanges 104, 106, clamp a portion of primary blade support arms 52, 54. Mounting flanges 104, 106, which are bolted to cross members 110, 112, rotate about nut and bolt combinations 114. Thus, the primary blade 50 may be rotated about a central axis defined by the bolts 114 to accomodate varying placement of the scraper 10 relative to a conveyor belt assembly 12. In addition, primary blade support arms 52, 54 are slidably adjustable with respect to support brackets 56, 58 and are fixed with respect to the support brackets by set screws 116, 118.

Figure 4:
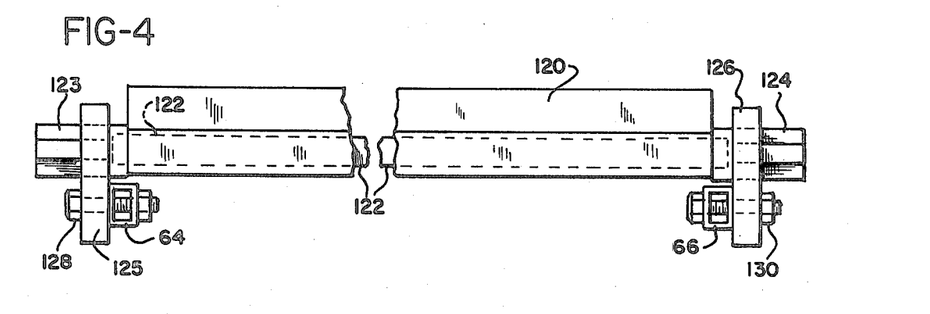
FIG. 4 is a side elevation of the secondary scraper blade of the scraper illustrated in FIG. 1.

As shown in FIGS. 1,2, and 4, secondary scraper 16 comprises a T-shaped blade of hardened rubber 120 which is molded over a central steel shaft 122. Shaft 122 protrudes outwardly from the ends of the blade 120 and is mounted by welds to stub ends 123, 124 having cruciform shaped ends which engage mating cruciform holes in secondary blade brackets 125, 126. The secondary blade brackets 125, 126 are bolted to the secondary blade support arms 64, 66 respectively by bolts 128, 130. Preferably, secondary blade support arms 64, 66 have a number of holes (not shown) therethrough, through which bolts 128, 130 may be inserted, thereby providing a means for adjusting the distance of the T-shaped blade 120 from the secondary axles 48.

From an inspection of the invention as shown in FIGS. 1 and 2, it is apparent that the scraper 10 is symmetric about a plane which is normal to and bisects the main shaft 49. Therefore, the following discussion, which is directed to the internal construction of the primary and secondary axles and actuator arm mounting brackets, as well as to the primary and secondary support brackets, will be limited to the right hand side of the scraper as it is shown in FIG. 2. It should be noted that the discussed construction applies equally to the corresponding components on the left hand side of the scraper, which are of similar construction and are mounted similarly with respect to each other but are of reverse hand to those components on the right hand side.

Figure 5:
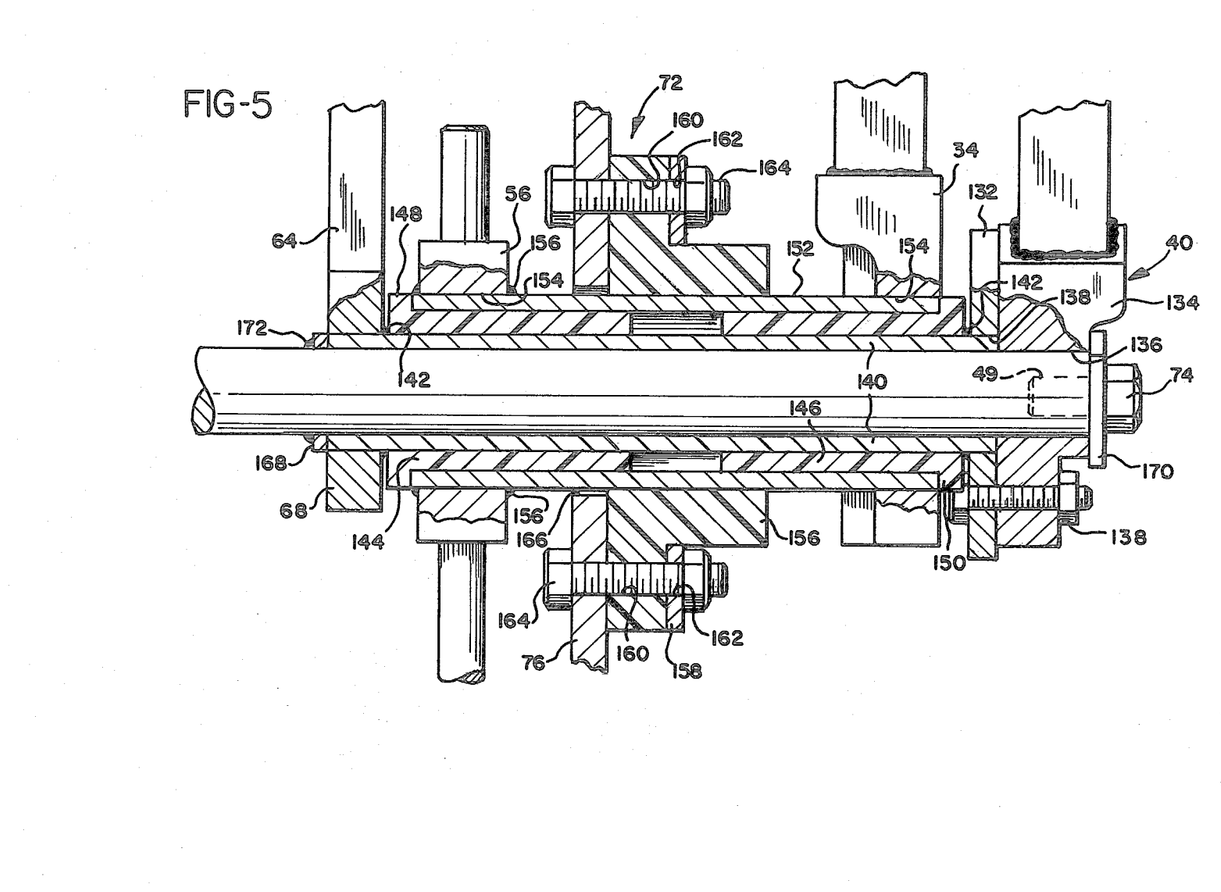
FIG. 5 is a view of the right hand portion of the scraper as shown in FIG. 2, with the inner and outer sleeves, the bearings, and the mounting flanges shown in section, and the primary and secondary tension arm mounting brackets, blade support brackets and blocks shown partially broken away.

As shown in FIG. 5, the secondary actuator arm mounting bracket 40 comprises a secondary mounting disk 132 and a secondary mounting collar 134. The secondary mounting collar 134 includes a central opening 136 sized to receive the main shaft 49. The secondary mounting disk 132 is joined to the secondary mounting collar by nut and bolt combinations 138 (also shown in FIG. 6). The secondary mounting disk 132 includes a central opening 138 which receives an inner sleeve 140. Inner sleeve 140, together with its counterpart on the opposite end or left hand side of the main shaft 49, comprise the primary axles 46 shown in FIG. 2. Secondary mounting disk 132 is fixedly mounted to the inner sleeve by welds 142.

Block portion 68 of secondary blade support arm 64 is fixedly mounted to the inner sleeve 140 at an inside end by welds 142. Inner sleeve 140 is cylindrical in shape and is sized to receive main shaft 49 and be capable of rotation relative to it.

Inner sleeve 140 is enclosed by inside and outside bushings 144, 146. Inside and outside bushings 144, 146 preferably are made of an ultra-high molecular weight, abrasion resistant polymeric resin such as nylon or polyethylene.

Inside and outside bushings 144, 146 each include an annular lip 148, 150 at an end. Outer sleeve 152, which is cylindrical in shape, is positioned over inside and outside bushings 144, 146 and between annular lips 148, 150. Outer sleeve 152, together with its counterpart on the opposite or left hand side of the scraper, comprise the primary axles 46 (shown in FIG. 2). At an outside end of the outer sleeve 152 is positioned primary actuator arm munting bracket 34. Mounting bracket 34 is generally annular in shape and includes an opening 154 which is sized to receive an outside end of the outer sleeve 152. The mounting bracket 34 is adjustably positioned on the outer sleeve 152 and is retained in a fixed position by a set screw 154 (shown in FIG. 2). Primary blade support bracket 56 includes a central opening 154 which is sized to receive the outer sleeve 152 and the bracket is mounted proximate an inside portion of the outer sleeve. Support bracket 56 is fixedly attached to the outer sleeve 152 by welds 156.

Mounting flange 72 is positioned intermediate the primary tension arm mounting bracket 34 and the primary blade support bracket 56. Mounting flange 72 comprises a cylindrical bearing member 156 and a retainer ring 158. The cylindrical bearing member preferably is made from an ultrahigh molecular weight, abrasion resistant polymeric resin such as nylon. Cylindrical bearing member 156 and retainer ring 158 include mating holes 160, 162 respectively, which receive mounting bolts 164 for attachment to a supporting wall 76. Mounting wall 76 preferably includes an orifice 166 sized to allow the insertion and free rotation of outer sleeve 152.

The inner and outer sleeves 140, 152 are maintained in position on the main shaft 49 by a fixed collar 168 and a cap washer 170. Fixed collar 168 is secured to the main shaft 49 by welds 172 and abuts the inside end of the inner sleeve 140. Cap washer 170 is retained on the end of a main shaft 49 by a cap screw 174 which is threaded into the main shaft. Cap washer 170 abuts the secondary mounting collar 134.

Figure 6:
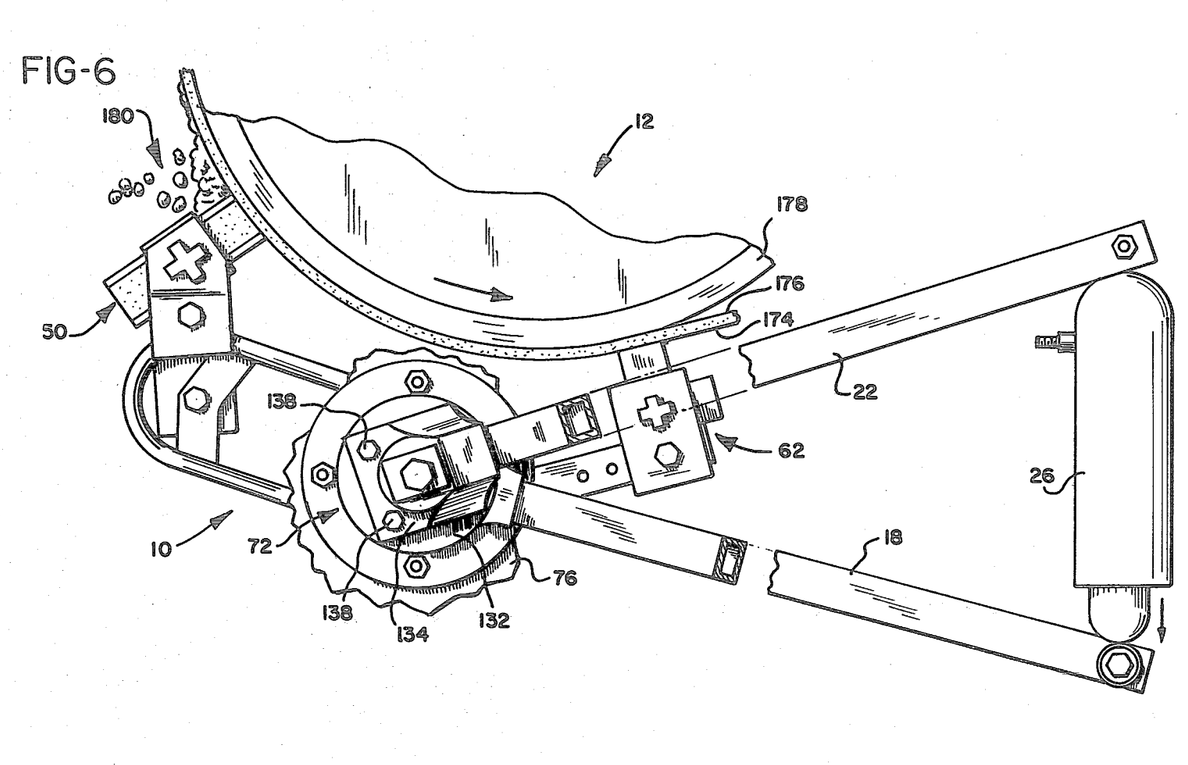
FIG. 6 is a side elevation of the scraper as shown in FIG. 2, taken at line 6—6 of FIG. 2.

The operation of the belt scraper 10 is best shown in FIGS. 1, 2, and 6. The scraper 10 is first mounted to supporting structure 76, 78 so that it is rotatably supported by mounting flanges 72, 74. As discussed previously, the primary and secondary axles 46, 48 should be freely rotatable relative to mounting flanges 72, 74 and supporting structure 76, 78. Secondary tension arms 22, 24 are rotated, thereby rotating secondary blade 62 counterclockwise (as shown in FIG. 6) until the secondary blade engages a working surface 174 of a conveyor belt 176. The primary actuator arms 18, 20, which are joined to secondary actuator arms 22, 24 by cylinders 26, 28, are now positioned beneath the secondary actuator arms. By loosening set screws 154 located in the primary actuataor arm brackets 34, 36, the outer sleeves 152 may be rotated with respect to the primary actuator arms 18, 20. This permits the primary blade 50, which is fixedly mounted to the outer sleeve 152, to be rotated clockwise upwardly into engagement with the working surface 174 of the belt 176.

Primary and secondary blades 50, 62 may then by adjusted on their respective support arms to engage the surface 174 of the belt 176. Set screws 154 are then retightened, thereby fixing the primary actuator arms 18, 20 to the outer sleeves 152.

The cylinders 26, 28 may then be charged with compressed air. Preferably, they are charged with at least 20 p.s.i.g., but may be charged as high as 120 p.s.i.g. This causes them to telescope outwardly, thereby forcing the primary actuator arms 18, 20 away from the secondary actuator arms 22, 24. This causes the primary blade 50 to rotate clockwise, and the secondary blade 62 to rotate counterclockwise about main shaft 49, thereby driving the primary and secondary blades upwardly (as shown in FIG. 6) into the working surface 174 of the belt 176.

As the belt 176 travels about the head pulley 178, accumulated particulate matter 180 deposited on the working surface 174 is scraped from the working surface by the primary blade 50. That working material which passes between the primary blade 50 and the working surface 174 encounters secondary blade 62 and may be removed by it. During operation, discontinuities encountered by the primary blade 50 may cause it to rotate or bounce counterclockwise away from the head pulley 178. This would cause the primary actuator arms 18, 20 also to rotate in a counterclockwise direction, and/or secondary actuator arms 22, 24 to rotate clockwise, thereby causing cylinders 26, 28 to contract and telescope into themselves. However, the cylinders 26, 28 continue to exert an extensive force, thereby maintaining the pressure of the primary blade against the working surface 174 of the belt 176 to minimize or eliminate the blades 50, 62 lifting away from the belt 176. Similarly, should the primary and/or secondary blades 50, 62 encounter discontinuities which could cause them to rotate closer to head pulley 178, the extensive force of cylinders 26, 28 would cause the blades to continue to exert a proper pressure against the belt for scraping.

The inherent damping qualities of air cylinders 26, 28 would prevent the primary blade 50 from chattering or bouncing away from the working surface 174 should it encounter a large lump of ice or rock which has adhered firmly to the belt, thereby preventing the blade from floating above the working surface 174 and possibly allowing matter 180 to pass beneath it.

After the conveyor belt assembly 12 has been shut down, the blades 50, 62 may be disengaged from the working surface 174 of the belt 176 simply by bleeding the air from cylinders 26, 28. This would permit the primary arms 18, 20 to rotate toward the secondary arms 22, 24, thereby permitting the blades to rotate away from the head pulley 178. This feature also facilitates the repair or replacement of blades 50, 62.

It should be noted that the T-shape of blade 62 provides three working surfaces which may be presented to the working surface 174 of a belt 176. To change working surfaces, the central shaft 122 is merely rotated with respect to secondary blade brackets 124, 126, thereby rotating the blade 90° and presenting a different leg of the T-shape to the working surface 174 of the belt 176.

With the exception of the scraper blades, which are constructed of rubber, and the bearing surfaces, which are made of a polymeric resin, the components of the scraper may be fabricated from medium strength steel. Since the steel components are not subject to abrasion against a belt, the steel should be selected for resistance to cyclic stresses and strength, rather than hardness.

While the form of apparatus herein described constitutes a preferred embodiment of this invention, it is to be understood that the invention is not limited to this precise form of apparatus, and that changes may be made therein without departing from the scope of the invention.

What is claimed is:

1. An improved conveyor belt scraper apparatus comprising:
   primary transversely extending belt scraper means having a portion adapted to come into engagement with a belt surface moving thereover;
   secondary transversely extending belt scraper means spaced from said primary scraper means and having a portion thereon adapted to come into engagement with a belt surface;
   means mounting said primary and secondary scraper means for rotational movement with respect to each other;
   at least one primary actuator arm;
   a primary axle attached to said primary actuator arm;
   at least one secondary actuator arm;
   a secondary axle attached to said secondary actuator arm and being capable of rotational movement with respect to said primary axle; and
   resilient means extending between said primary and secondary actuator arms being capable of urging said primary and secondary arms to rotate away from each other.

2. The belt scraper apparatus of claim 1 wherein said primary scraper means extends from said primary axle and said secondary scraper means extends from said secondary axle.

3. The belt scraper apparatus of claim 2 further comprising means for mounting said primary and secondary axles to a support.

4. The belt scraper apparatus of claim 3 wherein said primary axle is concentric with said secondary axle.

5. The belt scraper apparatus of claim 4 wherein
   said primary scraper means comprises a pair of primary scraper arms mounted to said primary axle, and a primary scraper blade adjustably mounted to and extending between said primary scraper arms such that it may engage a belt; and
   said secondary scraper means comprises a pair of secondary scraper arms mounted to said secondary axle, and a secondary scraper blade adjustably mounted to and extending between said secondary arms such that it may engage a belt.

6. The belt scraper apparatus of claim 5 wherein at least said primary actuator arm is adjustably mounted to said primary axle such that said primary actuator arm may be selectively positioned with respect to said primary scraper means.

7. The belt scraper apparatus of claim 6 further comprising a main axle, and wherein said secondary axle includes an inner sleeve enclosing said main axle, and said primary axle includes an outer sleeve enclosing said inner sleeve which is rotatable relative thereto.

8. The belt scraper apparatus of claim 7 further comprising bearing means spacing said outer sleeve from said inner sleeve.

9. The belt scraper apparatus of claim 8 wherein at least said secondary scraper blade is adjustably mounted to said secondary axle such that the distance from said secondary scraper blade to said secondary axle may be varied.

10. The belt scraper apparatus of claims 2 or 9 wherein said resilient means urges said primary and secondary actuator arms away from each other and thereby urges said primary and secondary scraper means toward each other such that said primary and secondary scraper means and may engage a conveyor belt passing therebetween.

11. For use with a conveyor belt, a belt scraper apparatus comprising:
   a main shaft;
   a pair of inner sleeves, each positioned over a different end of said shaft and having inside and outside edges;
   a pair of outer sleeves, each positioned over a different one of said inner sleeves and rotatable with respect thereto, said outer sleeves having inside and outside ends and being shorter than said inner sleeves such that said inside and outside ends of said inner sleeves are exposed;
   a pair of primary actuator arms, each mounted to a different one of said outside ends of said outer sleeves and extending substantially normal thereto;
   a pair of secondary actuator arms, each mounted to a different one of said outside ends of said inner sleeves and extending substantially normal thereto;
   a pair of air cyclinders, each attached to and extending from a different one of said primary actuator arms to a different one of said secondary actuator arms;
   a pair of primary scraper arms, each mounted to a different one of said inside ends of said outer sleeves and extending substantially normal thereto;
   a primary scraper blade adjustably attached to said scraper arms and extending therebetween;
   a pair of secondary scraper arms, each mounted to a different one of said inside ends of said inner sleeve and extending substantially normal thereto;
   a secondary scraper blade adjustably mounted to and extending between said secondary scraper arms; and
   a pair of mounting flanges, each defining an opening therethrough and positioned over a different one of said outer sleeves and including bearing means whereby said outer sleeves may rotate relative to said mounting flanges.

12. The scraper apparatus of claim 11 further comprising:
   a pair of fixed collars, each mounted to said main shaft and abutting a different one of said inner sleeves; and
   a pair of washer means, each mounted on a different end of said shaft such that said primary and secondary shafts are constrained from axial movement relative to said shaft between said fixed collars and said washer means.

13. Improved belt scraper apparatus for removing debris from the outer surface of a conveyor belt comprising:

a first transversely oriented belt scraper;
a second transversely oriented belt scraper positioned in spaced relation to said first belt scraper;
means rotationally mounting each of said belt scrapers for movement about a common axis; and
common means simultaneously urging said belt scrapers to rotate about said common axis in a direction tending to engage said scrapers with a belt to be scraped such that said common means provides a primary force acting to urge said first scraper in said engaging direction and a simultaneous reaction force tending to urge said second scraper in said engaging direction so that forces tending to urge said first scraper away from a belt are translated through said common means into forces tending to urge said second scraper into contact with a belt.

14. The scraper apparatus of claim 13 in which said common means includes an air-loaded-hydraulic shock absorber.

* * * * *